United States Patent
Jebb et al.

[11] 3,778,905
[45] Dec. 18, 1973

[54] SCRIBING INSTRUMENTS

[75] Inventors: Alan Jebb, Bromley; Colin Bowden Besant, Marlow Bottom, both of England

[73] Assignee: D-Mac Limited, Glasgow, Great Britain

[22] Filed: Mar. 9, 1971

[21] Appl. No.: 122,459

[30] Foreign Application Priority Data
Mar. 10, 1970  Great Britain .................. 11,314/70

[52] U.S. Cl. ............................................. 33/18 R
[51] Int. Cl. ............................................ B43l 13/00
[58] Field of Search ................. 33/18 R, 23 H, 1 M; 318/653

[56] References Cited
UNITED STATES PATENTS
| | | | |
|---|---|---|---|
| 2,497,418 | 2/1950 | Schroeder | 33/18 R |
| 2,810,960 | 10/1957 | Johnson et al. | 33/18 R |
| 2,735,178 | 2/1956 | Adams | 33/18 R |
| 2,946,939 | 7/1960 | Lind | 33/231 X |

FOREIGN PATENTS OR APPLICATIONS
| | | | |
|---|---|---|---|
| 1,024,019 | 3/1966 | Great Britain | 33/1 M |
| 940,608 | 10/1963 | Great Britain | 33/18 R |
| 1,113,057 | 11/1955 | France | 33/18 R |

*Primary Examiner*—Harry N. Haroian
*Attorney*—Young & Thompson

[57] ABSTRACT

A scribing instrument for use on a scribing surface has a body portion on which is mounted a stylus and the body is supported on the scribing surface by at least one variable support. Downward pressure applied to the body causes the variable support to contract such that the instrument takes up a first position in which the stylus contacts the surface and the instrument can then be moved across the surface in said first position for scribing. Release of the pressure causes the variable support to expand such that the instrument takes up a second position in which the stylus does not contact the surface, and the instrument can be moved in said second position across the surface without scribing it.

4 Claims, 3 Drawing Figures

CHART READING AND RECORDING APPARATUS 40

Inventor

By

Attorney

SCRIBING INSTRUMENTS

This invention relates to scribing instruments for basic drawing, and the scribing and tracing of charts, maps, diagrams, drawings, plans or the like (hereinafter referred to simply as "charts").

The invention may be adapted for use with chart reading and recording apparatus in which the positions and/or shapes of lines, letters, digits, symbols and the like are read and recorded in digital form.

Two forms of scribing instruments are available; the hand-held instruments and the instrument intended to rest in a stable position on a scribing surface. Instruments of the former type suffer from the disadvantages that a high degree of accuracy and an even pressure are difficult to maintain and the operator tends to tire quickly. Regarding the latter type of instruments, these suffer from the disadvantage that, in order to move the instrument from a first position on the scribing surface to a second position without scribing the intermediate surface, either the whole instrument must be bodily lifted from the scribing surface and then replaced at the second position or the stylus height must be adjusted by a screw to bring it out of contact with the scribing surface before sliding the instrument to the second position.

It is an object of the present invention to provide an improved scribing instrument which obviates or mitigates the above disadvantages.

According to the present invention, there is provided a scribing instrument comprising an annular body adapted to be placed on a scribing surface said body having an undercut portion which defines an overhang and an opening in the peripherally-inner wall of the annular body, means vertically adjustably mounting a stylus on said overhang, the stylus depending from said overhang, an upper surface of the body inclined with respect to the scribing surface, the uppermost portion of said mentioned surface being adjacent said stylus, support means for the body including at least one variable support depending from said body and intended to rest on said scribing surface, the body being movable with respect to said support between at least one position in which the scribing portion of the stylus contacts said surface and at least one other position in which the scribing portion of the stylus is clear of said surface.

An embodiment of the present invention will now be described by way of example, with reference to the accompanying drawings, in which.

Figure 1:
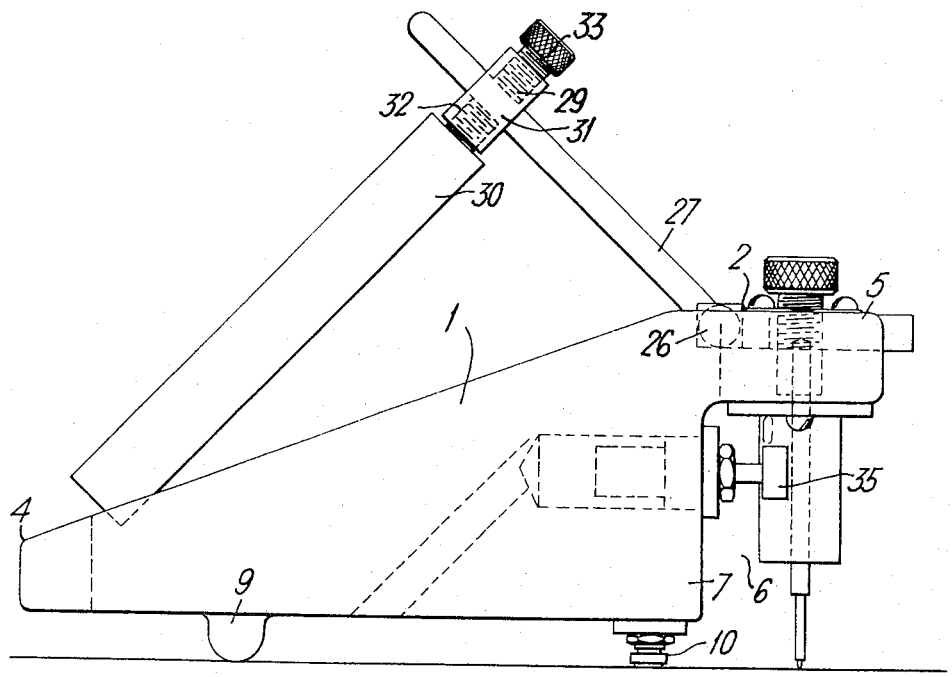
FIG. 1 is a side elevation of a scribing instrument according to the invention, adapted for use with chart reading and recording apparatus.
Figure 2:
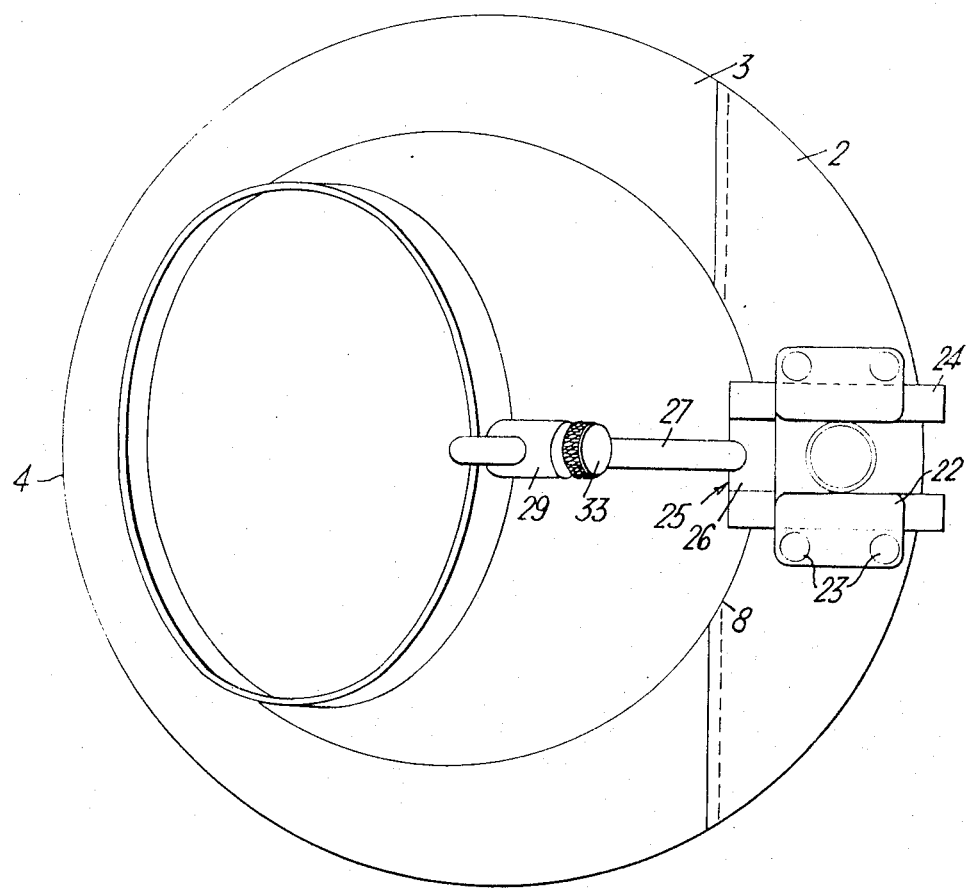
FIG. 2 is a top plan view of the scribing instrument of FIG. 1.
Figure 3:
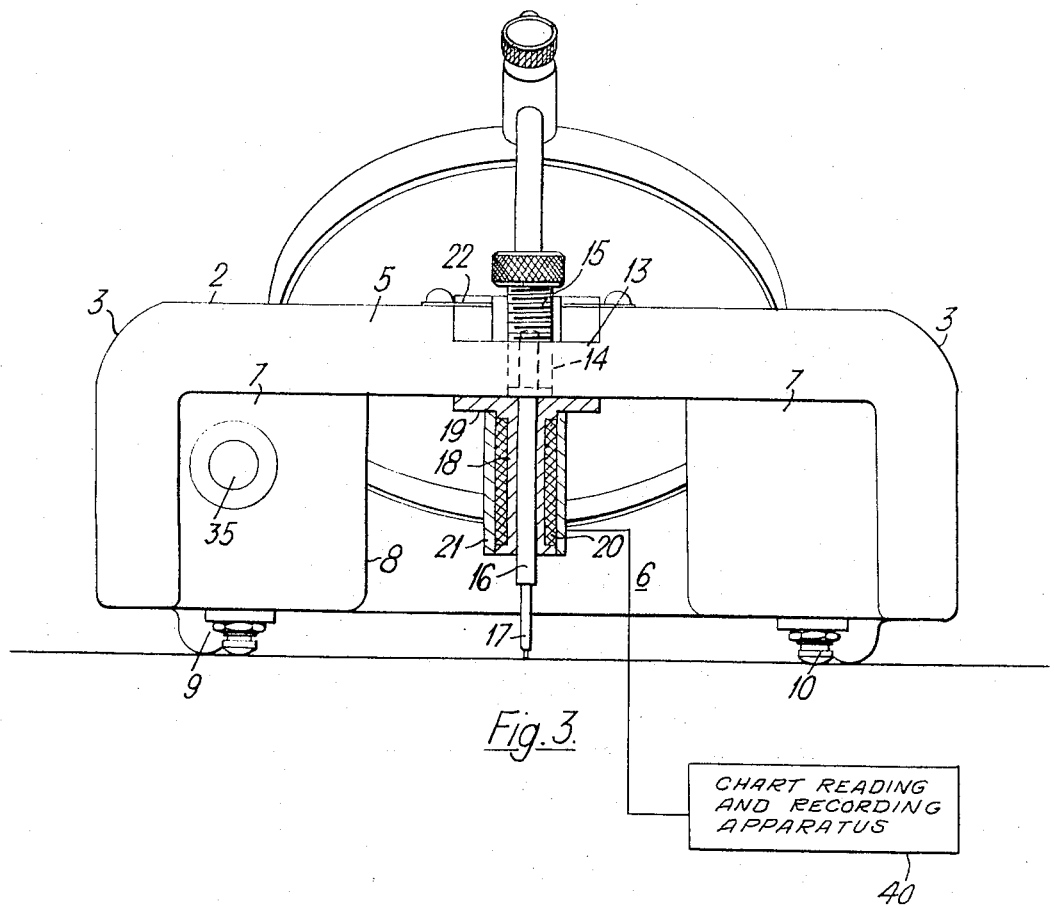
FIG. 3 is a front elevation of the scribing instrument of FIGS. 1 and 2.

The scribing instrument shown in the drawings is adapted to be used with a chart reading and recording apparatus of the type including a sensor supplying signals to a servomechanism in dependence on the position of a magnetic index movable over a chart, the servo-mechanism providing signals to an output unit such as a magnetic tape unit to produce a record of the chart readings. The scribing instrument described below serves as the movable magnetic index.

Referring to the drawings, the scribing instrument includes an annular shaped body 1 made of a plastics material. The upper surface of the body 1 has a horizontal portion 2 defining the maximum height of the upper surface and a portion 3 sloping downwardly from the portion 2 to a point 4 diametrically opposite the centre of the horizontal portion 2 and defining the minimum height of the upper surface.

A portion of the body 1 is cut away below the horizontal portion 2 to present a projection 5 extending outwardly of the body 1, a recess 6 bounded by two symmetrical vertical walls 7 and the under surface of the projection 5, an opening 8 being located in the inner periphery of the body 1 between the walls 7. That part of the body 1 which includes the projection 5 and the recess 6 is the front of the scribing instrument.

The body 1 is mounted on two rear supports 9 symmetrically disposed on the rear half of the body 1 and two front supports 10 symmetrically disposed on the front half of the body 1 adjacent the vertical walls 7. The rear supports 9 are in the form of rigid part spheres depending from the base of the body 1 and made of P.T.F.E. Alternatively, the supports 9 may be of other low friction material or may be in the form of balls or castors. The front supports 10 are in the form of spring loaded legs push fitted into holes (not shown) in the base of the body 1 and having feet made of P.T.F.E. or other low friction material. The body 1 is normally biased by the spring loaded legs 10 to an upward nonscribing position.

The projection 5 is provided with a central recess 13 extending from the inner periphery to the outer periphery of the horizontal portion 2. A vertical tapped hole 14, provided centrally in the recess 13 passes completely through the projection 5. An adjusting screw 15 has a threaded shank co-operating with the tapped hole 14 and a knurled head at one end of the shank. Mounted at the other end of the shank and extending downwardly out of the tapped hole 14 into the recess 6 is a vertical spindle 16 mounting a vertical stylus 17 at its lower end. A bush 18 surrounds the major part of the spindle 16 and is mounted on the underside of the projection 5 by means of screws passing through a flanged portion 19 of the bush 18. An input coil 20 surrounds the bush 18 coaxially with the spindle 16. A sleeve 21 surrounds the input coil 20. A hole (not shown) is provided in the sleeve 21 to provide for the passage of the A.C. supply leads (not shown) for the input coil 20.

Two spring plates 22 are mounted by means of screws 23 on the horizontal portion 2 of the body 1 to overhang part of each of opposed edges of the central recess 13. The central recess 13 and the overhanging spring plates 22 form a guide which receives the spaced legs 24 of a slide 25. A horizontal pin 26 is journalled for pivotal movement between the rear ends of the legs 24.

A rod 27 is rigidly fixed to the pivot pin 26 and intermediate its ends. A rod 29 carrying at one end a magnifying viewer 30 has a lateral hole 31 and a threaded axial bore 32. The rod 27 passes through the hole 31 and the rod 29 may be secured to any part of the rod 27 by means of a setting screw 33. The screw 33 has a knurled head and a threaded shank inserted into the threaded bore 32.

The slide 25 permits the magnifying viewer 30 to be adjustably positioned along a horizontal plane, the pivot pin 26 permits the magnifying viewer to be adjustably positioned along a vertical plane, and the setting screw 33 permits the magnifying viewer 30 to be focussed on the point of the stylus 14. Thus a wide range of positions for the viewer 30 is available. The pin 26 is so frictionally journalled in the legs 24 that the viewer will remain in the position in which it is set.

A self-return switch 35 mounted on one of the vertical walls 7 may be connected with a control system for the chart reading and recording apparatus 40, such as, for example, the chart reading and recording apparatus disclosed in our British Pat. No. 1,024,019 to trigger an output serialiser of the control system to cause values to be recorded only when the switch 35 is depressed.

Operation of the scribing instrument is as follows. The scribing instrument is first set up on a semi-transparent scribing surface covering a chart by manually adjusting screw 15 so that the tip of the stylus 17 is within 2 mm. of the scribing surface when the instrument is biased by the front supports 10 to the non-scribing position and the stylus is substantially vertical when the tip of the stylus is in contact with the scribing surface. The position of the magnifying viewer 30 is then set so that the operator may observe, from a position at the rear of the scribing instrument, the tip of the stylus 17 through the magnifying viewer 30 and the opening 8.

With the scribing instrument set up, the operator slides the instrument to a part of the scribing surface on which he wishes to commence scribing. Downward pressure is now applied to the horizontal portion 2 or that part of the sloping portion 3 forward of the rear supports 9 so that the bias force of the spring loaded legs 10 is overcome and the stylus tip comes into contact with the scribing surface. This is the downward scribing position of the instrument. The operator then presses the switch 35 and commences scribing. A record of the readings is made in the chart reading and recording apparatus 40 as long as the switch 35 is depressed.

If the operator wishes to scribe another part of the chart he removes the downward pressure so that the stylus 17 is automatically raised off the scribing surface under the action of the spring-loaded legs 10. He can then quickly re-position the instrument and continue scribing as before.

The scribing instrument is best controlled by an operator standing at the rear of the instrument with the palms of his hands situated symmetrically on the sloping portion 3 where it meets with the horizontal portion 2. He will then be able to control the downward pressure and at the same time selectively operate the switch 35 by means of a finger.

It is noted that the scribing instrument allows accurate pin-pointing and recording of features on the chart while at the same time leaving on the semi-transparent material a trace, the purpose of which is to give the operator a ready indication of those parts of the chart he has previously read.

Although the scribing instrument has been described with relation to a particular type of chart reading and recording apparatus, it is to be understood that it may be used with various types, including those which do not make use of servo-mechanisms.

In a modification of the invention, instead of the manually operable switch 35, a switch is incorporated within the spring-loaded legs 10. The switch is adapted to close as soon as the stylus 17 touches the scribing surface, thus causing the flow of information to the chart reading and recording apparatus 40.

In a further modification, data entry switches for the reading and recording apparatus are provided along part of the sloping portion 3.

Instead of chart reading and recording, the scribing instrument may be used simply as a high precision basic drawing pen, in which case, since only a trace on the semi-transparent scribing surface is required, the input coil 20 and the switch 35 are not included. In this form the instrument may have a fixed point stylus or a trailing point (chisel edge) stylus for use in basic drawing, and the scribing and tracing of charts.

We claim:

1. A scribing instrument comprising an annular body adapted to be placed on a scribing surface, said body having an undercut portion which defines an overhang and an opening in the peripherally inner wall of the annular body, means vertically adjustably mounting a stylus on said overhang, the stylus depending from said overhang, an upper surface of the body being inclined with respect to the scribing surface, the uppermost portion of said upper surface being adjacent said stylus, support means for the body including at least one fixed support depending from the body remote from the stylus and a pair of resilient supports disposed adjacent and on opposite sides of the stylus, whereby with the instrument resting on the scribing surface, the body tilts from a raised position in which the stylus is raised above the scribing surface to a lowered position in which the stylus contacts the scribing surface under the action of downward manual pressure applied in the region of the resilient supports, a magnifying viewer adjustably tiltably mounted on the annular body for viewing the scribing portion of the stylus through said opening, a magnetic device coaxial with the stylus and arranged such that the instrument may be used with a chart reading and recording apparatus, and a switch mounted on the body and connectible with the chart reading and recording apparatus selectively to cause chart readings to be recorded, the switch being adapted automatically to be operable when the body is in said lowered position and inoperable when the body is in said raised position.

2. A scribing instrument as claimed in claim 1, in which each resilient support is in the form of a spring-loaded leg.

3. A scribing instrument as claimed in claim 1, including an electrical supply source, wherein the magnetic device includes a coil connectible with said electrical supply source.

4. A scribing instrument as claimed in claim 1, in which the magnetic device is a permanent magnet.

* * * * *